March 19, 1963 R. B. SANDERS 3,082,366
MEANS FOR SPEED CONTROL OF A DIRECT CURRENT
MOTOR OPERATING FROM AN ALTERNATING
CURRENT SUPPLY SOURCE
Filed May 25, 1959
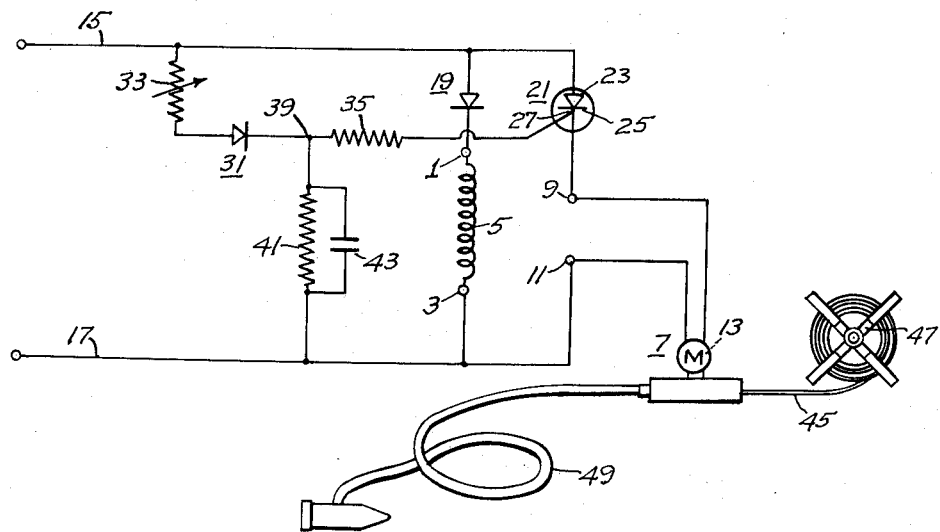
INVENTOR.
RICHARD B. SANDERS
BY
*Bruce & Brosler*
HIS ATTORNEYS

United States Patent Office 3,082,366
Patented Mar. 19, 1963

3,082,366
MEANS FOR SPEED CONTROL OF A DIRECT CURRENT MOTOR OPERATING FROM AN ALTERNATING CURRENT SUPPLY SOURCE
Richard B. Sanders, Albany, Calif., assignor to L & B Welding Equipment, Inc., a corporation of California
Filed May 25, 1959, Ser. No. 815,560
13 Claims. (Cl. 318—331)

My invention relates to motor control circuits and more particularly to an adjustable constant speed control circuit for a direct current motor operating from an alternating current supply source.

Such speed control circuits for electric motors have heretofore, for the most part, utilized electron discharge devices, such as the gas filled tube known as the "thyratron" for example. Such devices, while they function well, can cause the controlling equipment to become bulky by comparison with the apparatus to be controlled which may, by itself, be of limited or small size.

Such electron discharge devices further, require filaments or heaters for the generation of electrons, and the heating up of such filaments or heaters, necessarily entails a warm up period to prepare the device for operation.

Also, electron discharge devices such as the thyratron, introduce a voltage drop through the same of the order of ten volts and when functioning in the armature circuit of a motor to be controlled, such drop in voltage lowers the motor speed proportionately unless the circuit is designed to compensate for such drop in voltage.

Among the objects of my invention are:

(1) To provide a novel and improved control circuit for an electric motor;

(2) To provide a novel and improved control circuit for a direct current motor operated from an alternating current supply source;

(3) To provide a novel and improved constant speed control circuit for an electric motor operating from an alternating current supply source;

(4) To provide a novel and improved constant speed motor control circuit requiring no electron discharge tubes;

(5) To provide a novel and improved motor speed control apparatus occupying but a limited amount of space;

(6) To provide a novel and improved motor speed control circuit involving no warm-up period;

(7) To provide a novel and improved motor speed control circuit in which the voltage drop is negligible;

(8) To provide a novel and improved motor speed control circuit of great sensitivity and high efficiency;

(9) To provide a novel and improved motor speed control circuit having excellent load compensation; and

(10) To provide a novel and improved motor speed control circuit adapted to the control of electrode wire feed in automatic and semi-automatic welding equipment.

Additional objects of my invention will be brought out in the following description of a preferred embodiment of the same taken in conjunction with the accompanying drawings wherein:

The FIGURE is a circuit diagram depicting the motor speed control circuit of the present invention as applied to the control of speed of a direct current motor of the shunt type, in feeding electrode wire in automatic or semi-automatic welding.

Referring to the drawings for details of my invention in its preferred form, the same provides a pair of terminals 1 and 3 for connection thereto of the field winding 5 of a motor 7, and a second pair of terminals 9 and 11 for the connection thereto of the armature winding 13 of such motor. Of a pair of leads 15 and 17 adapted for connection to an alternating current source, one of the leads, 15, is connected to one of the field winding terminals 1 through a half-wave rectifier 19 of the metallic type, while the other lead 17 connects directly to the remaining field winding terminal 3, whereby to provide direct current for use in such field winding.

In a somewhat similar manner, rectified voltage is applied to the armature winding terminals 9 and 11, except instead of utilizing a standard type metallic rectifier, I employ a gated rectifier 21 having an anode 23, a cathode 25, and a gate 27, the anode being connected to one of the leads 15 while the cathode is connected to one of the armature winding terminals 9, while the other armature winding terminal 11 is connected to the other lead 17.

Rectification through this gated rectifier is controlled in the present invention, in accordance with variations in back electromotive force of the motor when connected to the terminals provided therefor.

Such control means comprises a direct current control circuit from one of the leads 15 to the gate 27, such direct current control circuit including a rectifier 31 and variable resistance in series therewith, such resistance being preferably in the form of a pair of resistors 33 and 35, the former being variable and of the order of 5000 ohms, connected between the lead 15 and the rectifier 31 while the other resistor 35 may be of the fixed type, connected between the rectifier 31 and the gate 27 and of a value of the order of 2300 ohms.

A branch circuit connected between the other lead 17 and a point 39 on the direct current control circuit between the rectifier 31 and the fixed resistor 35, includes a resistor 41 of the order of 1800 ohms, shunted by a capacitor 43 having a value of the order of 8 microfarads. The values given are not critical but represent an embodiment of the invention as applied to a small motor of fractional horsepower utilized in driving the electrode wire 45 in automatic and semi-automatic welding.

A gated rectifier 19 is a control device which will fire and pass current when the gate current reaches a threshold value of the order of 15 milliamperes, and will thereafter continue to pass current until the voltage across it is brought to zero. When power is derived from a conventional alternating current supply source, as in the present instance, there will be 60 half cycles per second during which current can flow through the gated rectifier. Accordingly there will be 60 cross-overs per second through zero voltage, when extinguishment of current will occur if current flow exists at the time of cross-over. Whether such current flow through the gated rectifier exists depends upon the value of the gate current at the start of each alternate half cycle, and this in turn depends on two factors namely, the resistance in the gate circuit, and the back electromotive force generated by the motor.

Assume the motor 7 to be at a standstill and the adjustable resistor 33 is gradually cut out until the threshold value of gate current is reached. At this point, firing occurs and alternate half cycles of current will begin to flow through the armature of the motor and start the motor armature rotating, during the course of which the motor will pick up speed and generate an increasing back electromotive force. Since the gate current was assumed to be at threshold value, a small back electromotive force (low speed) will serve to reduce the value of the gate current to a value just below the threshold value, as a result of which, firing will not occur on the next alternate half cycle and the motor armature will tend to "slow down," and such slowing down may continue for the next few alternate half cycles sufficient to bring the gate current back to threshold value and cause the gated rectifier to again begin firing and supply current to the motor armature, following which the motor will again pick up speed to the point of developing a back electromotive force sufficient to reduce the gate current again to a point just below threshold value, and the cycle will repeat itself.

While this may seem to indicate that the motor speed will not remain constant but will vary considerably, it must be remembered that all of this occurs within a few cycles of alternating current which represents but a fraction of a second, during which the gate current and motor speed change only insignificantly.

By further reducing the value of resistance in the gate circuit, a greater back electromotive force will have to be developed by the motor to bring the gate current down to a point just below its threshold value, and consequently the motor will have to reach a higher rate of speed to accomplish this. While this may require a few more alternating current cycle periods to accomplish, the time interval involved will still consume but a fraction of a second and for all practical purposes, the speed of the motor will be deemed constant at this new speed.

Accordingly, the variable resistance 33 in the gate circuit provides means for adjusting the control current level and thus controlling the speed of the motor 7, and whichever speed is selected, the speed of the motor will for all practical purposes remain constant at that value.

The same characteristics of the circuit, as described above, bring about very good load compensation in the operation of the circuit which results from the fact that as a load is applied to the motor, such load will tend to slow down the rotational speed of the armature. As the armature tends to slow down, the back electromotive force generated by the motor begins to decrease thereby causing more current to flow in the gate circuit of the rectifier which in turn causes the gated rectifier to fire for a greater number of alternate half cycles which in turn tends to overcome the effect of the increase in load on the motor armature and hold the speed of the motor constant.

In the application of the invention to automatic and semi-automatic welding, the motor 7 will supply the power for driving electrode wire 45 from a reel 47 through a flexible casing 49 to the work to be welded, and accordingly need only be of a fractional horse power rating of the order of ⅛ horsepower. The speed control circuit, by reason of the fact that it requires no electron tubes, may be assembled into a very small, light and compact unit of perhaps one tenth the size of a comparable unit utilizing electron discharge tubes. The complete absence of filaments or heaters eliminates the warm-up time formerly required when utilizing electron tubes, and at the same time essentially eliminates the voltage drop which occurs across such electron tubes when functioning in a circuit.

It will be apparent that my invention fulfills all the objects attributed thereto, and while I have disclosed the same in its preferred form as applied to automatic and semi-automatic welding, it will be apparent that the invention is subject to alteration and modification without departing from the underlying principles involved, and I accordingly do not desire to be limited in my protection to the specific details illustrated and described except as may be necessitated by the appended claims.

I claim:

1. A motor control circuit comprising a motor having a field winding and an armature winding; a pair of leads adapted for connection to an alternating current supply source; means in circuit with said field winding between said leads for rectifyinng alternating current from such supply source for energizing said field winding; means in circuit with said armature winding between said leads for rectifying alternating current from such supply source for energizing said armature winding, said means including the anode and cathode of a gated solid state rectifier having an anode, a cathode and a gate; and means for controlling rectification through said gated rectifier in accordance with variations in back electromotive force generated by said motor, said means comprising a direct current control circuit from one of said leads to said gate and including a rectifier, and means for adjusting the amplitude of the resulting rectified current to said gate.

2. A motor control circuit comprising a motor having a field winding and an armature winding; a pair of leads adapted for connection to an alternating current supply source; means in circuit with said field winding between said leads for rectifying alternating current from such supply source for energizing said field winding; means in circuit with said armature winding between said leads for rectifying alternating current from such supply source for energizing said armature winding, said means including the anode and cathode of a gated solid state rectifier having an anode, a cathode and a gate; and means for controlling rectification through said gated rectifier in accordance with variations in back electromotive force generated by said motor, said means comprising a direct current control circuit from one of said leads to said gate and including a rectifier, and means for adjusting the amplitude of the resulting rectified current to said gate.

3. A motor control circuit comprising a motor having a field winding and an armature winding; a pair of leads adapted for connection to an alternating current supply source; means in circuit with said field winding between said leads for rectifying alternating current from such supply source for energiizng said field winding; means in circuit with said armature winding between said leads for rectifying alternating current from such supply source for energizing said armature winding, said means including the anode and cathode of a gated solid state rectifier having an anode, a cathode and a gate; and means for controlling rectification through said gated rectifier in accordance with variations in back electromotive force generated by said motor, said means comprising a direct current control circuit from one of said leads to said gate and including a rectifier and resistance in series therewith; and means for manually altering said resistances to adjust the current level to said gate in said control circuit.

4. A motor control circuit comprising a motor having a field widing and an armature winding; a pair of leads adapted for connection to an alternating current supply source; means in circuit with said field winding between said leads for rectifying alternating current from such supply source for energizing said field winding; said means including a metallic type rectifier; means in circuit with said armature winding between said leads for rectifying alternating current from such supply source for energizing said armature winding, said means including a gated rectifier having an anode, a cathode and a gate; and means for controlling rectification through said gated rectifier in accordance with variations in back electromotive force generated by said motor, said means comprising a direct current control circuit from one of said leads to said gate and including a rectifier and variable resistance in series therewith, and a branch circuit between said other lead and a point on said direct current control circuit between said rectifier and a portion of said resistance.

5. A motor control circuit comprising a motor having a field winding and an armature winding; a pair of leads adapted for connection to an alternating current supply source; means in circuit with said field winding between said leads for rectifying alternating current from such supply source for energizing said field winding; said means including a metallic type rectifier; means in circuit with said armature winding between said leads for rectifying alternating current from such supply source for energizing said armature winding, said means including a gated rectifier having an anode, a cathode and a gate; and means for controlling rectification through said gated rectifier in accordance with variations in back electromotive force generated by said motor, said means comprising a direct current control circuit from one of said leads to said gate and including a rectifier and variable resistance in series therewith, and a branch circuit between said other lead and a point on said direct current control circuit between said rectifier and a portion of said resistance, said branch circuit including a resistor and a condenser in parallel therewith.

6. Apparatus for control of speed of a motor having a field winding and an armature winding, said apparatus comprising a pair of field winding terminals; a pair of armature winding terminals; a pair of leads adapted for connection to an alternating current supply source; means in circuit with said pair of field winding terminals for rectifying alternating current from such supply source, said means including a metallic type rectifier; means in circuit with said armature winding terminals for rectifying alternating current from such supply source, said means including a gated solid state rectifier having an anode, a cathode, and a gate, a connection from said anode to one of said leads, a connection from said cathode to one of said armature winding terminals, and a connection from said other armature winding terminal to the other of said leads; and means for adjusting the amplitude of a direct current to said gate.

7. Apparatus for control of speed of a motor having a field winding and an armature winding, said apparatus comprising a pair of field winding terminals; a pair of armature winding terminals; a pair of leads adapted for connection to an alternating current supply source; means in circuit with said pair of field winding terminals for rectifying alternating current from such supply source, said means including a metallic type rectifier; means in circuit with said armature winding terminals for rectifying alternating current from such supply source, said means including a gated solid state rectifier having an anode, a cathode, and a gate, a connection from said anode to one of said leads, a connection from said cathode to one of said armature winding terminals, and a connection from said other armature winding terminal to the other of said leads; and means for controlling rectification through said gated rectifier in accordance with variations in back electromotive force of a motor when connected to said terminals, said means comprising a direct current control circuit from one of said leads to said gate and including a rectifier and an adjustable resistance in series therewith.

8. Apparatus for control of speed of a motor having a field winding and an armature winding, said apparatus comprising a pair of field winding terminals; a pair of armature winding terminals; a pair of leads adapted for connection to an alternating current supply source; means in circuit with said pair of field winding terminals for rectifying alternating current from such supply source, said means including a rectifier, a connection from one side of said rectifier to one of said leads, a connection from the other side of said rectifier to one of said field winding terminals, and a connection from the other of said field winding terminals to the other of said leads; means in circuit with said armature winding terminals for rectifying alternating current from such supply source, said means including a gated rectifier having an anode, a cathode, and a gate, a connection from said anode to one of said leads, a connection from said cathode to one of said armature winding terminals, and a connection from said other armature winding terminal to the other of said leads; and means for controlling rectification through said gated rectifier in accordance with variations in back electromotive force of a motor when connected to said terminals, said means comprising a direct current control circuit from one of said leads to said gate and including a rectifier and resistance in series therewith, and a branch circuit between said other lead and a point on said direct current control circuit between said rectifier and a portion of said resistance, said branch circuit including a resistor and a condenser in parallel therewith.

9. Apparatus for control of speed of a motor having a field winding and an armature winding, said apparatus comprising a pair of field winding terminals; a pair of armature winding terminals; a pair of leads adapted for connection to an alternating current supply source; means in circuit with said pair of field winding terminals for rectifying alternating current from such supply source, said means including a metallic type rectifier to one of said leads, a connection from the other side of said rectifier to one of said field winding terminals, and a connection from the other of said field winding terminals to the other of said leads; means in circuit with said armature winding terminals for rectifying alternating current from such supply source, said means including a gated rectifier having an anode, a cathode, and a gate, a connection from said anode to one of said leads, a connection from said cathode to one of said armature winding terminals, and a connection from said other armature winding terminal to the other of said leads; and means for controlling rectification through said gated rectifier in accordance with variations in back electromotive force of a motor when connected to said terminals, said means comprising a direct current control circuit from one of said leads to said gate and including a rectifier and variable resistance in series therewith, and a branch circuit between said other lead and a point on said direct current control circuit between said rectifier and a portion of said resistance, said branch circuit including a resistor and a condenser in parallel therewith.

10. A motor control circuit comprising a motor having a field winding and an armature winding; a pair of leads adapted for connection to an alternating current supply source; means in circuit with said field winding between said leads for rectifying alternating current from such supply source for energizing said field winding; means in circuit with said armature winding between said leads for rectifying alternating current from such supply source for energizing said armature winding, said means including a gated solid state rectifier having an anode, a cathode and a gate; and means for controlling rectification through said gated rectifier in accordance with variations in back electromotive force generated by said motor, said means comprising a direct current control circuit from one of said leads to said gate and including a rectifier, said direct current control circuit including a variable resistance, a rectifier and a further resistance connected all in series across said alternating current supply source, and a connection from a point of said resistances to said gate.

11. A motor control circuit comprising a motor having a field winding and an armature winding; a pair of leads adapted for connection to an alternating current supply source; means in circuit with said field winding between said leads for rectifying alternating current from such supply source for energizing said field winding; means in circuit with said armature winding between said leads for rectifying alternating current from such supply source for energizing said armature winding, said means including a gated solid state rectifier having an anode, a cathode and a gate; and means for controlling rectification through said gated rectifier in accordance with variations in back electromotive force generated by said motor, said means comprising a direct current control circuit connected across said current supply source from one of said leads to said gate and including a rectifier, said control circuit including a variable voltage divider supplying variable bias to said gate.

12. A circuit for controlling the speed of an electric motor having an armature and field winding fed from a source of A.C. voltage, comprising a variable voltage divider source connected across said source, a solid state controlled rectifier having an anode, a cathode, and a gate, said rectifier having its cathode connected to one end of said armature winding, the other end of said armature winding being connected to said source and said anode being connected to said source, and a diode and a smoothing condenser connected in circuit with said voltage divider and said gate, said voltage divider, diode, and smoothing condenser providing a variable direct current bias voltage to said gate.

13. A motor control circuit comprising a motor having a field winding and an armature winding adapted for connection to a source of A.C. voltage, a gated solid state rectifier having an anode, a cathode, and a gate, said anode and cathode being connected in series with said armature winding across said source, said cathode being connected to one end of said armature winding, and a source of controllable bias voltage for said gate, said source of controllable bias voltage including a variable voltage divider connected across said supply and including at least two resistances, at least one of said resistances being shunted by a smoothing condenser, and a diode connected to said gate and to said variable voltage divider for rendering said bias voltage unidirectional.

References Cited in the file of this patent

UNITED STATES PATENTS

| | | |
|---|---|---|
| 2,656,500 | Dee | Oct. 20, 1953 |
| 2,785,368 | Elliot | Mar. 12, 1957 |
| 2,839,714 | Mueller | June 17, 1958 |
| 2,939,064 | Momberg et al. | May 31, 1960 |
| 2,977,523 | Cockrell | Mar. 28, 1961 |

OTHER REFERENCES

Publ., Solid State Thyratron Switches Kilowatts, Frenzel-Gutzueller, Electronics, March 28, 1958.